(12) United States Patent
Dragone et al.

(10) Patent No.: US 10,956,623 B2
(45) Date of Patent: Mar. 23, 2021

(54) ENCLOSURE WITH TAMPER RESPONDENT SENSOR

(71) Applicant: International Business Machines Corporation, Armonk, NY (US)

(72) Inventors: Silvio Dragone, Olten (CH); Michael Fisher, Poughkeepsie, NY (US); William Santiago Fernandez, Poughkeepsie, NY (US); Ryan Elsasser, Poughkeepsie, NY (US); James Busby, New Paltz, NY (US); John R. Dangler, Rochester, MN (US); William L. Brodsky, Binghamton, NY (US); David C. Long, Wappingers Falls, NY (US); Stefano S. Oggioni, Besana in Brianza (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 271 days.

(21) Appl. No.: 16/007,408

(22) Filed: Jun. 13, 2018

(65) Prior Publication Data
US 2019/0384942 A1 Dec. 19, 2019

(51) Int. Cl.
*G06F 21/87* (2013.01)
*H01L 41/04* (2006.01)
(Continued)

(52) U.S. Cl.
CPC ............ *G06F 21/87* (2013.01); *H01L 41/042* (2013.01); *H01L 41/0475* (2013.01);
(Continued)

(58) Field of Classification Search
CPC ... G06F 21/87; H04L 41/042; H04L 41/0475; H04L 41/37; H04L 41/1132;
(Continued)

(56) References Cited

U.S. PATENT DOCUMENTS 9,591,776 B1 * 3/2017 Brodsky ............... G06F 1/1656
9,717,154 B2 7/2017 Brodsky et al.
(Continued)

OTHER PUBLICATIONS

E. Ferres, V. Immler, A. Utz, A. Stanitzki, R. Lerch and R. Kokozinski, "Capacitive Multi-Channel Security Sensor IC for Tamper-Resistant Enclosures," 2018 IEEE Sensors, New Delhi, 2018, pp. 1-4, doi: 10.1109/ICSENS.2018.8589716. (Year: 2018).*
(Continued)

*Primary Examiner* — Chau Le
(74) *Attorney, Agent, or Firm* — Cantor Colburn LLP; Daniel Morris (57) ABSTRACT

The present invention relates to a method to fabricate a tamper respondent assembly. The tamper respondent assembly includes an electronic component and an enclosure fully enclosing the electronic component. The method includes printing, by a 3-dimensional printer, a printed circuit board that forms a bottom part of the enclosure and includes a first set of embedded detection lines for detecting tampering events and signal lines for transferring signals between the electronic component and an external device. The electronic component is assembled on the printed circuit board, and a cover part of the enclosure is printed on the printed circuit board. The cover part includes a second set of embedded detection lines. Sensing circuitry can be provided for sensing the conductance of the first set of embedded detection lines and the second set of embedded detection lines to detect tampering events.

25 Claims, 7 Drawing Sheets

(51) Int. Cl.
*H01L 41/047* (2006.01)
*H01L 41/37* (2013.01)
*H01L 41/113* (2006.01)
*H01L 41/18* (2006.01)
*H01L 41/23* (2013.01)
*H01L 41/053* (2006.01)

(52) U.S. Cl.
CPC ........ *H01L 41/053* (2013.01); *H01L 41/1132* (2013.01); *H01L 41/183* (2013.01); *H01L 41/23* (2013.01); *H01L 41/37* (2013.01)

(58) Field of Classification Search
CPC ..... H04L 41/183; H04L 41/23; H04L 41/053; H04L 41/314; H04L 41/29
See application file for complete search history.

(56) References Cited

U.S. PATENT DOCUMENTS

| | | | | |
|---|---|---|---|---|
| 10,271,424 | B2* | 4/2019 | Dragone | H05K 1/0275 |
| 2007/0269159 | A1* | 11/2007 | Dangler | G02B 6/3608 |
| | | | | 385/14 |
| 2012/0117666 | A1* | 5/2012 | Oggioni | G06F 21/87 |
| | | | | 726/34 |
| 2013/0104252 | A1* | 4/2013 | Yanamadala | G06F 21/76 |
| | | | | 726/34 |
| 2013/0283386 | A1* | 10/2013 | Lee | G06F 21/86 |
| | | | | 726/26 |
| 2014/0325688 | A1* | 10/2014 | Cashin | G06F 21/86 |
| | | | | 726/34 |
| 2015/0163933 | A1 | 6/2015 | Steiner | |
| 2016/0062418 | A1 | 3/2016 | Lewis | |
| 2017/0089729 | A1 | 3/2017 | Brodsky et al. | |
| 2017/0094808 | A1 | 3/2017 | Brodsky et al. | |
| 2017/0094847 | A1 | 3/2017 | Fisher et al. | |
| 2019/0311157 | A1* | 10/2019 | Immler | H04L 9/3278 |

OTHER PUBLICATIONS

H. Eren and L. D. Sandor, "Fringe-Effect Capacitive Proximity Sensors for Tamper Proof Enclosures," 2005 Sensors for Industry Conference, Houston, TX, 2005, pp. 22-26, doi: 10.1109/SICON. 2005.257863. (Year: 2005).*

Jason Ford, "Piezo Device Harvests Energy From Sound", The Engineer, Retrieved From https://www.theengineer.co.uk/piezo-device-harvests-energy-from-sound/, Published Sep. 1, 2014. (Year: 2014).*

Dragone et al., "Enclosure With Tamper Respondent Sensor," U.S. Appl. No. 16/007,385, filed Jun. 13, 2018.

List of IBM Patents or Patent Applications Treated As Related; Date Filed: Jun. 13, 2018, 2 pages.

Paley et al., "Active Protection against PCB Physical Tampering," 2016 17th International Symposium on Quality Electronic Design (ISQED), IEEE, 2016, pp. 356-361.

* cited by examiner

ENCLOSURE WITH TAMPER RESPONDENT SENSOR

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly comprising one or more electronic components may be mounted in an enclosure comprising a security sensor. A security sensor may be e.g. a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic components of the assembly.

In view of increasingly sophisticated methods of attacking such assemblies, it is desirable to provide tamper respondent assemblies and corresponding fabrication methods with enhanced security.

SUMMARY

According to an embodiment of a first aspect of the invention, a method to fabricate a tamper respondent assembly is provided. The tamper respondent assembly comprises an electronic component and an enclosure fully enclosing the electronic component. The method comprises printing, by a 3-dimensional printer, a printed circuit board. The printed circuit board forms a bottom part of the enclosure and comprises a first set of embedded detection lines for detecting tampering events and signal lines for transferring signals between the electronic component and an external device. Further steps include assembling the electronic component on the printed circuit board and printing, by the 3-dimensional printer, a cover part of the enclosure on the printed circuit board. The cover part of the enclosure comprises a second set of embedded detection lines. A further step comprises providing sensing circuitry for sensing the conductance of the first set of embedded detection lines and the second set of embedded detection lines to detect tampering events.

The embedded detection lines may be configured to provide a secure layer around the electronic components. According to such an embodiment, the complete enclosure is fabricated by 3-dimensional printing including the two sets of embedded detection lines, namely the first set of embedded detection lines in the printed circuit board and the second set of embedded detection lines in the cover part of the enclosure. Furthermore, such a method is very flexible and allows to provide a large variety of shapes and forms of the first and the second embedded detection lines. This may significantly increase the security of the system.

In particular, according to an embodiment, the first set of embedded detection lines and the second set of embedded detection lines may be formed as integral conductive mesh. The integral conductive mesh may enclose fully and seamlessly the electronic component and hence may provide a seamless protection shield around the electronic component with enhanced security. In particular, according to such an embodiment, the transition between the printed circuit board and the cover part may be may be formed with a seamless and tamper proof connection without any interruption of the protection shield.

According to an embodiment, the first set of embedded detection lines and the second set of embedded detection lines are electrically connected to each other. This allows to provide a continuous and seamless electric shield around the electronic component. This further enhances the security of the assembly.

According to an embodiment, the method comprises embedding one or more sensor devices into the enclosure. Such sensors devices are additional sensors that are integrated in the enclosure in addition to the first and the second set of embedded detection lines. Such sensors are in particular prefabricated sensors that are not formed by the 3-dimensional printing process. Hence such a method allows to integrate additional sensors directly into the housing together with the detection lines. This increases the tamper security of the system.

According to an embodiment, embedding the one or more sensor devices into the enclosure comprises steps of interrupting the printing of the printed circuit board, assembling one or more sensor devices into the printed circuit board and continuing the printing of the printed circuit board.

Hence according to such an embodiment, the additional sensor devices are integrated into the printed circuit board. This enhances the detection possibilities for tampering events through the printed circuit board.

According to an embodiment, the embedding of the one or more sensor devices into the enclosure comprises steps of interrupting the printing of the cover part of the enclosure, assembling one or more sensor devices into the cover part of the enclosure and continuing the printing of the cover part of the enclosure.

Hence according to such an embodiment, the additional sensor devices are integrated into the cover part of the enclosure. This enhances the detection possibilities for tampering events through the cover part of the enclosure.

According to some embodiments, the one or more sensor devices may be embodied as a piezo sensor. This allows to detect mechanical forces applied on the enclosure, e.g. physical deformations and/or unusual vibrations of the tamper respondent assembly.

According to some embodiments, the one or more sensor devices may be embodied as an optical sensor. Such optical sensors may be e.g. photo diodes that are configured to detect light entering the enclosure due to tampering attempts.

According to some embodiments, the one or more sensor devices may be embodied as a proximity sensor. Such sensors may e.g. emit an electromagnetic field or electromagnetic radiation, e.g. infrared radiation, and observe changes in the emitted field or return signal. According to further embodiments, hall sensors may be integrated to detect magnetic fields associated with tampering attempts.

According to an embodiment, the assembling of the electronic component on the printed circuit board comprises attaching the electronic component to the printed circuit board by a soldering technique. This is an efficient and reliable method. According to embodiments, a plurality of soldering techniques may be used, e.g. reflow soldering.

According to an embodiment, the method comprises integrating a piezoelectric sensor in the enclosure. The integrating comprises steps of providing a base structure comprising a first conductive layer, depositing a piezoelectric layer on the first conductive layer, covering the piezoelectric layer with a second conductive layer and providing sensing circuitry for observing sensing signals of the piezoelectric layer. The piezoelectric layer comprises a plurality of nanorods.

Such a method allows the integration of a piezoelectric device into a tamper respondent assembly in an efficient, flexible and reliable way. Furthermore, embodiments of the invention facilitate a large sensing area compared e.g. with the sensing area of discrete piezoelectric sensors. The integrated piezoelectric device according to embodiments of the invention enhances the security of the tamper respondent assembly.

According to an embodiment, the depositing of the piezoelectric layer comprises steps of spraying a plurality of nanoparticles onto the first structure and growing the plurality of nanorods on the first structure.

Such a spraying further facilitates an integration of the piezoelectric device into the tamper respondent assembly in a smart, reliable and cost-efficient way.

According to an embodiment, growing the plurality of nanorods comprises a chemical growth process. Such a chemical growth process further facilitates an integration of the piezoelectric device into the tamper respondent assembly in a smart, reliable and cost-efficient way.

According to an embodiment, the chemical growth process is a low temperature growth process performed at a temperature below 150° C. This facilitates ease of manufacturing.

According to an embodiment, the chemical growth process involves placing the first structure with the nanoparticles in a solution comprising hexamethylenetetramine (HMT). This facilitates an efficient growth process and is in addition a cost-efficient method. In embodiments of the invention, a temperature range for such a process is between about 80° C. and about 100° C.

According to an embodiment, additional elements/atoms of the material of the nanoparticles might be placed into the solution to enlarge the growth resources. As an example, the solution may comprise a mixture of zinc nitrate and HMT.

According to an embodiment, the chemical growth process may be accelerated by adding additives to the solution, in particular poly(ethylenimene) (PEI), ammonium hydroxide or ammonium chloride. This may produce the nanorods more rapidly.

According to an embodiment, the chemical growth process involves a controlled hydrolysis of the nanoparticle precursor, e.g. the Zn precursor, and a controlled supply of hydroxide ions to maintain a nanoparticle to [OH] ratio, e.g. a zinc to [OH] ratio that will lead to nanorod formation.

According to an embodiment, the nanoparticles are selected from the group consisting of: zinc oxide (ZnO), lead zirconate titanate (PZT) and barium titanate (BTO). These materials have been identified as particularly suitable for methods embodying the invention.

According to an embodiment, the plurality of nanoparticles are electrostatically pre-loaded to facilitate an adhesion of the nanoparticles on the first conductive layer. According to an embodiment, the first conductive layer is coupled to a predefined electrostatic potential to facilitate an adhesion of the nanoparticles on the first conductive layer.

With such embodiments, the deposition of the piezoelectric layer can be supported by electrostatic forces.

According to an embodiment, spraying the nanoparticles comprises spraying a solution comprising the nanoparticles and a solvent. This is a particularly efficient method to apply the nanoparticles on the first conductive layer. The solvent may facilitate a smooth and uniform application of the nanoparticles on the first conductive layer and may be subsequently removed, e.g. by heating.

According to an embodiment, the nanorods have an aspect ratio between about 2 and about 50.

According to an embodiment, the first conductive layer comprises a conductive mesh. Such a mesh-structure of the conductive mesh may support adhesive forces between the base structure and the first conductive layer. According to a further embodiment, the second conductive layer comprises also a conductive mesh.

According to an embodiment of a second aspect of the invention, a tamper respondent assembly is provided. The tamper respondent assembly comprises a 3-dimensionally printed circuit board and an electronic component to be protected and assembled on the 3-dimensionally printed circuit board. The tamper respondent assembly further comprises an enclosure fully enclosing the electronic component and sensing circuitry. The printed circuit board forms a bottom part of the enclosure and comprises a first set of embedded detection lines. In addition, the printed circuit board comprises signal lines for transferring signals between the electronic component and an external device. The tamper respondent assembly further comprises a 3-dimensionally printed cover part of the enclosure that is arranged on the printed circuit board and comprises a second set of embedded detection lines. The sensing circuitry is configured to sense the conductance of the first set and the second set of embedded detection lines to detect tampering events.

Embodiments of the tamper respondent assembly may safeguard security sensitive data and circuitry that could be otherwise compromised by reverse engineering and other exploitation efforts. The sensing circuitry may continuously monitor to thwart drilling efforts. The electronic component, e.g. microchip, and its stored data may be protected from undesired analysis by the sensing circuitry.

According to an embodiment, the first set of embedded detection lines and the second set of embedded detection lines are electrically connected to each other.

According to an embodiment, the first set of embedded detection lines and the second set of embedded detection lines are formed as integral conductive mesh, the integral conductive mesh fully and seamlessly encloses the electronic component.

According to an embodiment, the sensing circuitry is configured with a plurality of sensing profiles, the plurality of sensing profiles comprising a first set of sensing profiles associated to non-tampering events and a second set of sensing profiles associated to tampering events. This may improve a reliable functioning of the tamper respondent assembly and it may in particular reduce false alarms.

According to an embodiment, one or more sensor devices are embedded in the printed circuit board and/or the cover part of the enclosure.

According to an embodiment, the one or more sensor devices may be embodied as a piezoresistive sensor, an optical sensor, a proximity sensor or a hall sensor.

According to an embodiment, the tamper respondent assembly comprises a piezoelectric sensor integrated in the enclosure. The piezoelectric sensor comprises a base structure comprising a first conductive layer, a second conductive layer and a piezoelectric layer arranged between the first conductive layer and the second conductive layer. The piezoelectric layer comprises a plurality of nanorods. The sensing circuitry is configured to observe sensing signals of the integrated piezoelectric sensor.

According to an embodiment of a third aspect of the invention, a security system for protecting security-sensitive information is provided. The security system comprises a tamper respondent assembly according to the second aspect. The sensing circuitry is configured to sense the conductance of the first set and the second set of embedded detection lines to detect tampering events and to provide an alarm signal to the electronic component upon detection of predefined sensing profiles. The electronic component is configured to initiate an action to obstruct analysis of the security-sensitive information upon receipt of the alarm signal. According to embodiments, the security sensitive information may be e.g. erased upon detection of a tampering event and receipt of a corresponding alarm signal.

According to an embodiment of another aspect, a computer program product for observing sensing signals of sensing circuitry of a security system for protecting security-sensitive information according to the third aspect is provided. The computer program product comprises a computer readable storage medium having program instructions embodied therewith, the program instructions executable by the security system to cause the security system to perform a method. The method comprises steps of observing sensing signals of the first set and the second set of embedded detection lines, providing an alarm signal upon detection of predefined sensing profiles and initiating an action to obstruct analysis of the security-sensitive information upon receipt of the alarm signal.

Advantages of the features of one aspect of the invention may apply to corresponding features of another aspect of the invention.

Devices and methods embodying the present invention will now be described, by way of non-limiting examples, and in reference to the accompanying drawings. Technical features depicted in the drawings are not necessarily to scale. Also some parts may be depicted as being not in contact to ease the understanding of the drawings, whereas they may very well be meant to be in contact, in operation.

DETAILED DESCRIPTION

Figure 1:
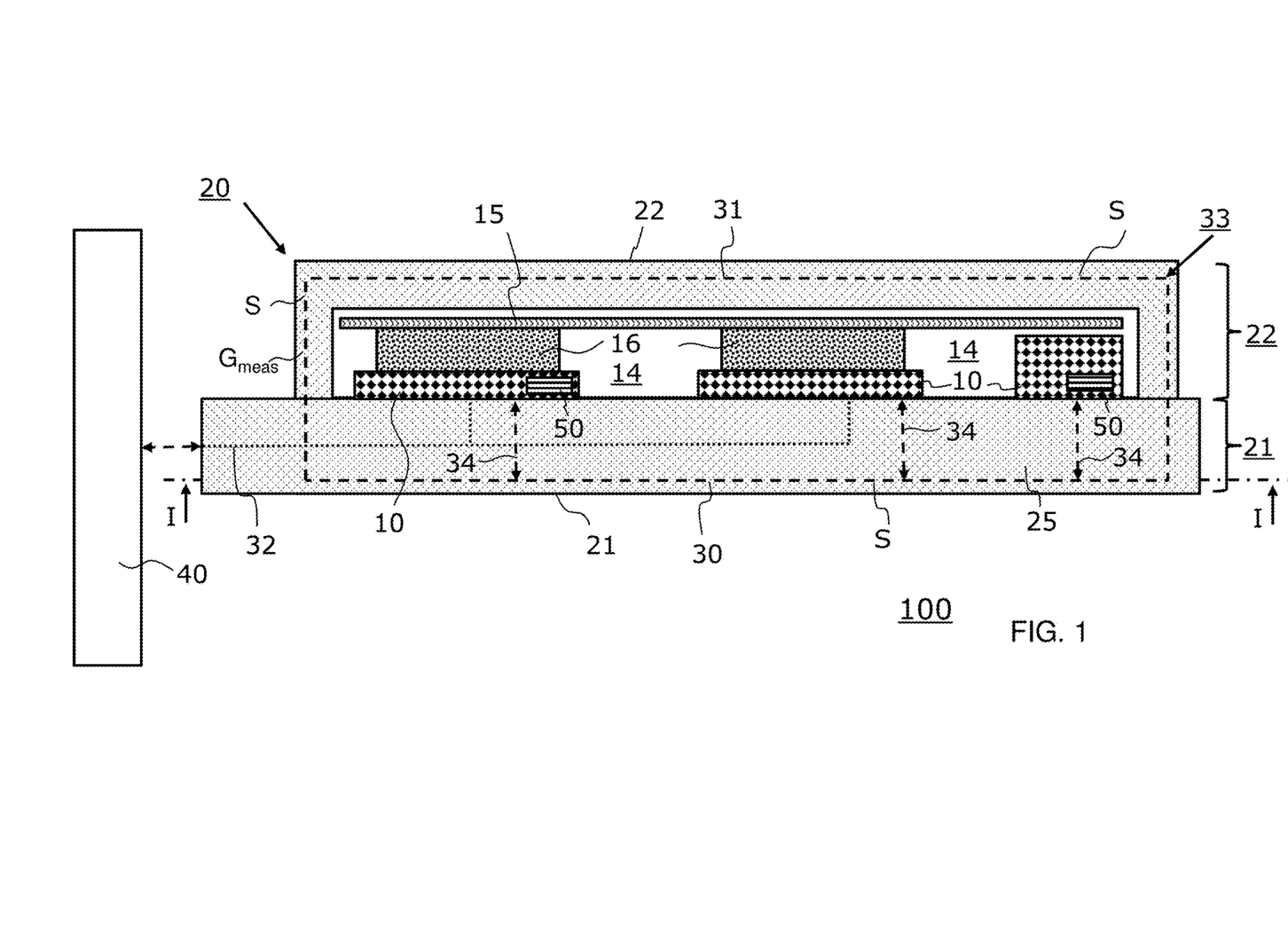
FIG. 1 shows an exemplary cross sectional view of a tamper respondent assembly according to an embodiment of the invention.

FIG. 1 shows an exemplary cross sectional view of a tamper respondent assembly 100 according to an embodiment of the invention. The tamper respondent assembly 100 can be fabricated by fabrication methods according to another aspect of the invention as will be described further below.

The tamper respondent assembly 100 comprises a printed circuit board 21 and a cover part 22 which is arranged on the printed circuit board 21. The cover part 22 and the printed circuit board 21 form an integral enclosure 20 for a secure volume 14 and fully enclose the secure volume 14.

The printed circuit board 21 as well as the cover part 22 have been fabricated by a 3-dimensional printing process. The printed circuit board 21 may comprise an electrically insulating material as base material 25, in particular a polymer, in particular a composite material such as fiber-reinforced plastic (FRP).

One or more electronic components 10 are arranged on the printed circuit board 21 and hence within the secure volume 14. The electronic components 10 shall be protected against tampering by the enclosure 22. The tamper respondent assembly 100 may be in particular a security system for protecting security-sensitive information. The one or more electronic components 10 may be in particular configured to store and/or process security sensitive information. As an example, the electronic components 10 may be e.g. microchips that are configured to perform encryption/decryption operations and may comprise e.g. crypto-cards for this purpose. The security-sensitive information may be e.g. encryption and decryption keys. One or more of the electronic components 10 may be thermally coupled to a heat spreader 15. The coupling between the electronic components 10 and the heat spreader 15 may be improved by thermal coupling elements 16, e.g. by a thermal paste or a thermal compound.

The printed circuit board 21 comprises a first set of embedded detection lines 30. The first set of embedded detection lines 30 is configured to detect tampering events. The detection lines 30 may be in particular electrical wires or electrical lines which provide a predefined conductance/resistance.

The printed circuit board 21 further comprises signal lines 32 which provide a communication link, in particular an electrical communication link, between the electronic component 10 and one or more external devices 40. Hence the electronic components 10 may communicate with the external devices 40 such as e.g. a server system located outside the secure volume 14 via the signal lines 32. The signal lines 32 are illustrated by dotted lines and may be in particular high-speed signal lines.

The cover part 22 of the enclosure 20 is arranged on the printed circuit board 21 and comprises a second set of embedded detection lines 31. The detection lines 31 of the second set may be in particular electrical wires or lines which provide a predefined conductance/resistance.

The first set of embedded detection lines 30 and the second set of embedded detection lines 31 are electrically connected to each other. According to embodiments of the invention, the first set of embedded detection lines 30 and the second set of embedded detection lines 31 form an integral electrical shield around the secure volume 14. According to embodiments of the invention, the first set of embedded detection lines 30 and the second set of embedded detection lines 31 are formed as integral conductive mesh 33. The integral conductive mesh 33 fully and seamlessly encloses the electronic components 10.

The electronic components 10 comprise embedded sensing circuitry 50. The sensing circuitry 50 is electrically connected to the first set of embedded detection lines 30 and the second set of embedded detection lines 31 via connection lines 34. The sensing circuitry 50 is configured to sense as sensing signal S the conductance of the first set 30 and the second set 31 of embedded detection lines or more particularly of the integral mesh 33 to detect tampering events. More particularly, the sensing circuitry 50 observes the conductance of the integral mesh 33. If an adversary tries to tamper the enclosure 20, e.g. by drilling a hole into the enclosure 20, a part of the integral mesh 33 will be damaged. This causes a change of the conductance of the integral mesh 33 which can be detected by the sensing circuitry 50. More particularly, the integral mesh 33 has a predefined target conductance Gset which corresponds to the conductance in a non-tampered state. If the measured conductance Gmeas as measured by the sensing circuitry 50 deviates from the target conductance Gset by a predefined threshold, the sensing circuitry detects a tampering event and may issue e.g. an alarm. In particular, the sensing circuitry may 50 may be configured with a plurality of sensing profiles. The plurality of sensing profiles may comprise a first set of sensing profiles associated to non-tampering events and a second set of sensing profiles associated to tampering events. As an example, changes of the measured conductance Gmeas caused by temperature variations or by vibrations occurring during a regular operation of the tamper respondent assembly, can be stored and associated to non-tampering events, while changes of the measured conductance Gmeas caused by irregular or abnormal events are associated to tampering events. This may avoid false positives.

Figure 2:
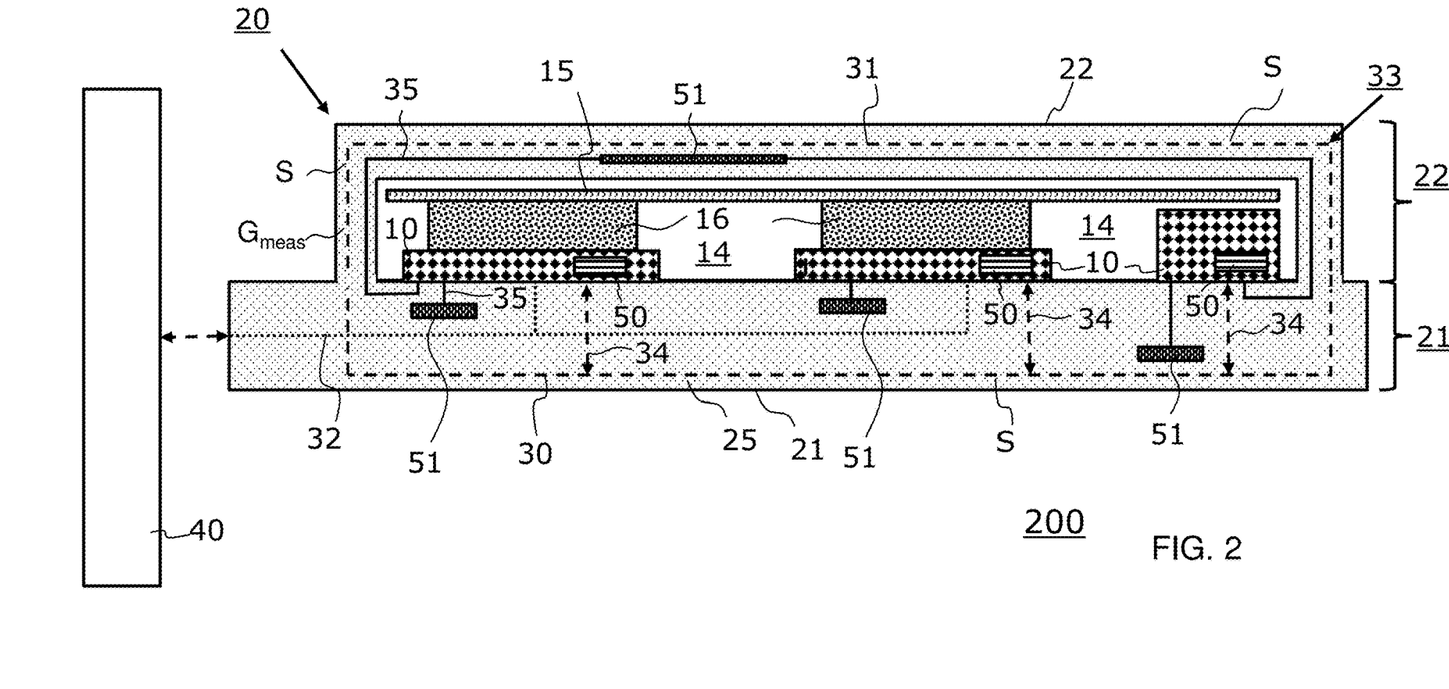
FIG. 2 shows an exemplary cross sectional view of a tamper respondent assembly according to another embodiment of the invention.

FIG. 2 shows an exemplary cross sectional view of a tamper respondent assembly 200 according to another embodiment of the invention. The tamper respondent assembly 200 can be fabricated by fabrication methods according to another aspect of the invention as will be described further below.

The tamper respondent assembly 200 is to a large extent similar to the tamper respondent assembly as described with reference to FIG. 1. Accordingly, the same reference numerals are used for the same or similar parts. In addition to components of the tamper respondent assembly 100, the tamper respondent assembly 200 comprises sensor devices 51 which are embedded in the enclosure 20. The sensor devices 51 are additional sensors that are integrated in the enclosure 20 in addition to the first and the second set of embedded detection lines 30, 31. The sensor devices 51 are in particular prefabricated sensors that are not formed by the 3-dimensional printing process.

As shown in FIG. 2, the sensor devices 51 of the assembly 200 are integrated into the printed circuit board 21 as well as into the cover part 22 of the enclosure 20. This enhances the detection possibilities for tampering events. The sensor devices 51 may be e.g. piezo sensors, optical sensors, proximity sensor or hall sensors.

Figure 3:
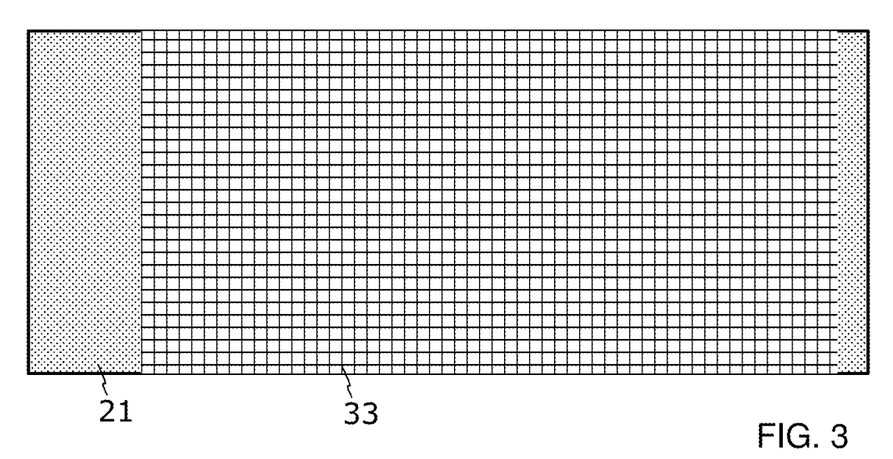
FIG. 3 shows a cross sectional view of an integral conductive mesh taken along the section line I-I of FIG. 1.

FIG. 3 shows a cross sectional view of the integral conductive mesh 33 taken along the section line I-I of FIG. 1. The section line I-I is only illustrated outside the printed circuit board 21 for ease of illustration. The mesh size of the integral conductive mesh 33 and the geometry of the mesh apertures may be adapted according to the desired security needs and the desired conductance values of the integral mesh. According to embodiments, the mesh apertures may have a square or a rectangular form.

Figure 4:
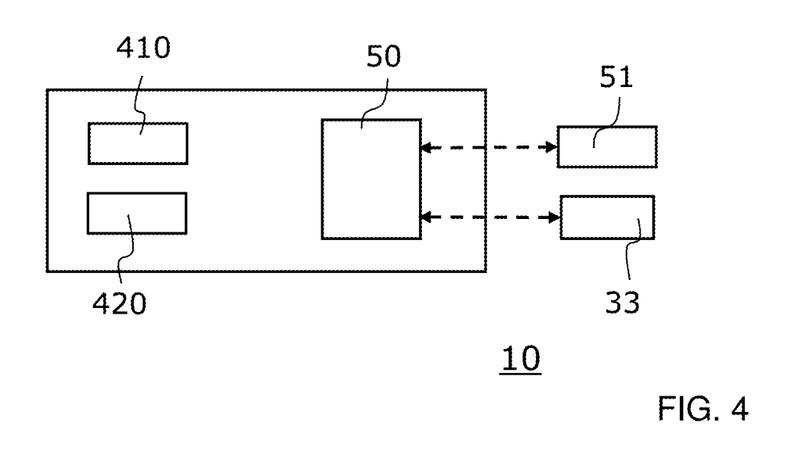
FIG. 4 shows an exemplary block diagram of an electronic component according to an embodiment of the invention.

FIG. 4 shows an exemplary block diagram of an electronic component 10 according to an embodiment of the invention.

The electronic component 10 may be e.g. a microchip, in particular a microchip for processing and/or storing security sensitive information. The electronic component 10 comprises sensing circuitry 50 which may be electrically coupled to a sensor device 51. The sensor device 51 may be e.g. a piezoelectric sensor, an optical sensor, a hall sensor or a proximity sensor.

In addition, the sensing circuitry 50 is configured to observe conductance changes of the integral conductive mesh 33.

Furthermore, the electronic component 10 comprises a memory 410 and a processing unit 420.

The memory 410 may be configured to store security sensitive information, e.g. encryption and decryption keys. The memory 410 may be further configured to store a first set of sensing profiles associated to non-tampering events and a second set of sensing profiles associated to tampering events.

The processing unit 420 may be e.g. configured to process security sensitive information and to perform e.g. encryption and decryption operations.

The processing unit 420 may be further configured to receive an alarm signal from the sensing circuitry 50 if a tampering attempt has been detected. Then the processing unit 420 may initiate an action to obstruct analysis of the security-sensitive information, e.g. by erasing the security sensitive information that has been stored in the memory 410.

FIGS. 5a, 5b, 5c, 5d, 5e, 5f and 5g illustrate in a schematic and simplified way method steps of a method for fabricating a tamper respondent assembly according to an embodiment of the invention. The tamper respondent assembly comprises an electronic component and an enclosure fully enclosing the electronic component. The method may be used to fabricate tamper respondent assemblies as illustrated in FIGS. 1, 2, 3 and 4.

Figure 5A:
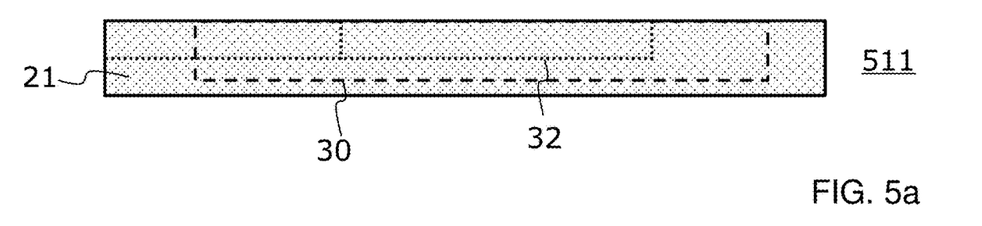
FIGS. 5a, 5b, 5c, 5d, 5e, 5f and 5g illustrate in a schematic and simplified way method steps of a method for fabricating a tamper respondent assembly according to an embodiment of the invention.

At a step 511, as illustrated in FIG. 5a, a 3-dimensional printer starts to print a printed circuit board 21. The 3-dimensional printing includes the printing of a first set of embedded detection lines 30 as well as signal lines 32.

After printing a part of the printed circuit board 21, the printing is interrupted.

Figure 5B:
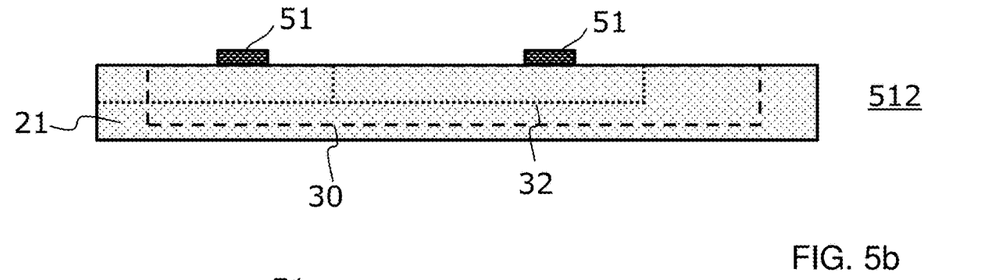

Then, at a step 512, as illustrated in FIG. 5b, one or more sensor devices 51 are assembled on the printed circuit board 21 or more particularly on the part of the printed circuit board 21 that has been fabricated before the interruption of the printing process. The assembling of the sensor devices 51 may include soldering the sensor devices 51 on printed lines or contact pads that have been formed during the previous 3-dimensional printing process. The sensor devices 51 are sensor devices that have been pre-fabricated by a separate process. The sensor devices 51 may be e.g. piezo devices/sensors, proximity sensors, hall devices or optical devices.

Figure 5C:
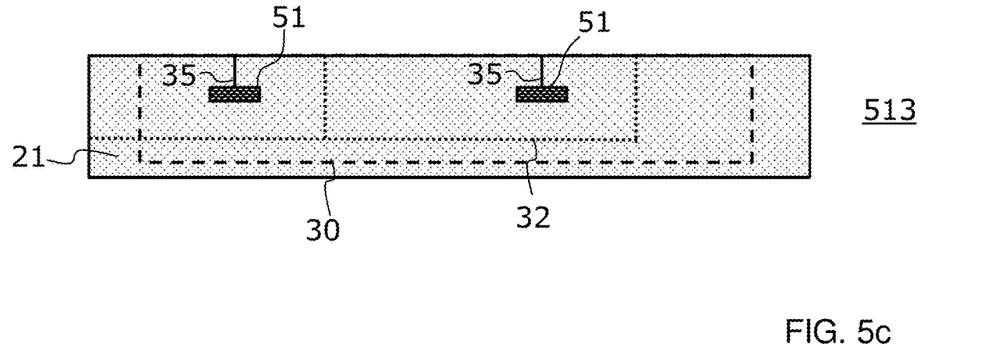

At a subsequent step 513, as illustrated in FIG. 5c, the 3-dimensional printing process is continued until the printing of the printed circuit board 21 has been completed. As a result, the sensor devices 51 as well as the first set of detection lines 30 and the signal lines 31 have been embedded into the printed circuit board 21.

Furthermore, the printing of the printed circuit board 21 may include the printing of connection lines 35 for connecting the sensor device(s) 51 with electronic components 10.

Figure 5D:
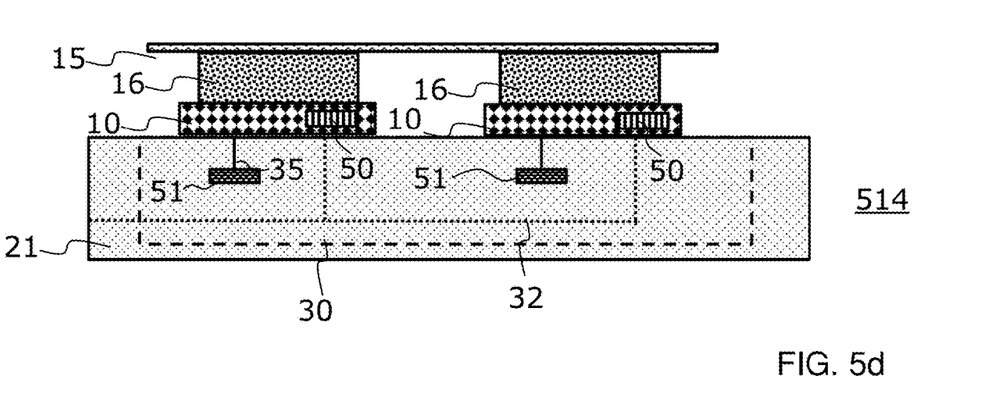

At a subsequent step 514, as illustrated in FIG. 5d, two electronic components 10 are assembled on the printed circuit board 21. According to embodiments, the assembling of the electronic component 10 on the printed circuit board 21 involves attaching the electronic component 10 to the printed circuit board 21 by a soldering technique. As an example, reflow soldering or other soldering techniques may be used. The electronic components 10 may be in particular prefabricated electronic components and may be in particular configured to store and/or process security sensitive information. As an example, the electronic components 10 may be e.g. crypto-cards as mentioned above. The step 514 includes providing sensing circuitry 50 for sensing the conductance of the first set of embedded detection lines 30 and a second set of embedded detection lines, the latter being fabricated in the following. According to some embodiments, the sensing circuitry 50 for sensing the conductance of the detection lines may be integrated into the electronic components 10 as illustrated in FIGS. 5d to 5g. According to other embodiments, separate sensing circuitry may be assembled on the printed circuit board 21 or according to yet other embodiments may be integrated within the printed circuit board 21 in the same manner as the separate sensor devices 51.

Figure 5E:
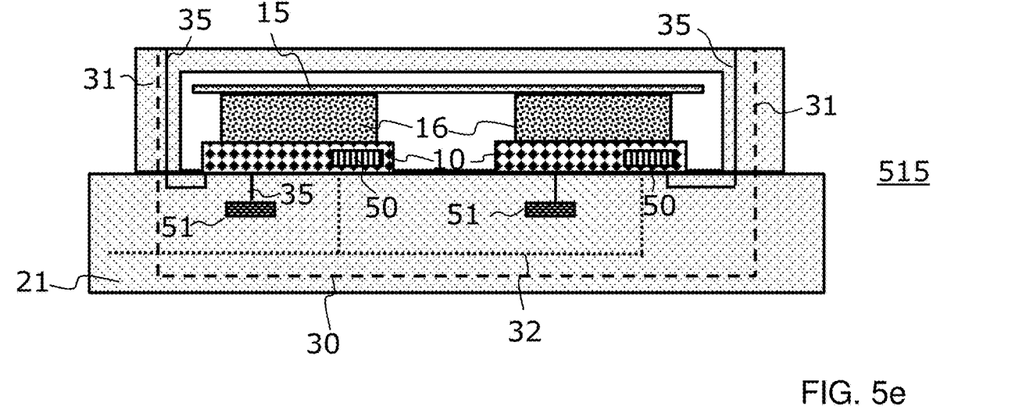

At a subsequent step 515, as illustrated in FIG. 5e, the fabrication process is continued by printing by the 3-dimensional printer a cover part 22 of the enclosure 20. The cover part 22 is printed on the printed circuit board 21. The printing of the cover part 21 includes the printing of a second set of embedded detection lines 31. The printing is performed such that the second set of embedded detection lines 31 are seamlessly electrically and mechanically connected with the first set of embedded detection lines 30.

Figure 5F:
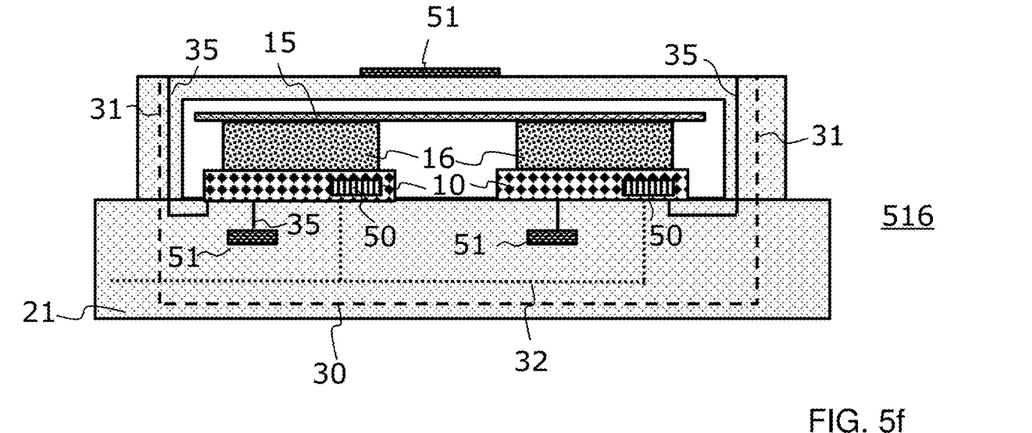

At a subsequent step 516, as illustrated in FIG. 5f, the printing of the cover part 22 of the enclosure 20 is interrupted. Then one or more sensor devices 51 are assembled into the cover part 22 of the enclosure 20. The assembling of the sensor devices 51 may include soldering the sensor devices 51 on printed connection lines or contact pads that have been formed during the previous 3-dimensional printing process. The sensor devices 51 are again sensor devices that have been pre-fabricated by a separate process. As illustrated in FIGS. 5e and 5f, the printing of the cover part 22 may include the printing of connection lines 35 between the electronic components 10 and the sensor device(s) 51.

Figure 5G:
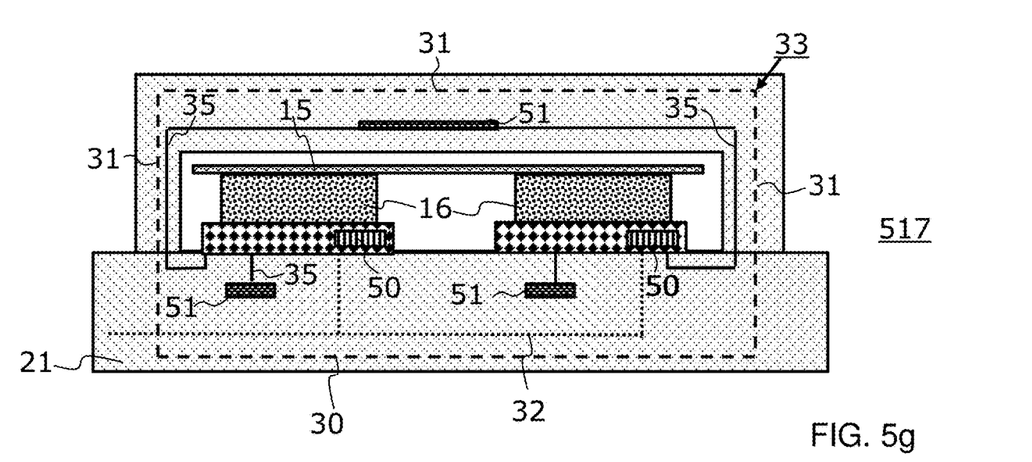

Finally, at a step 517, as illustrated in FIG. 5g, the 3-dimensional printing of the cover part 21 of the enclosure 20 is continued until the cover part 22 is completed.

As mentioned, the second set of embedded detection lines 31 integrated in the cover part 22 and the first set of electrical connection lines 30 integrated in the printed circuit board 21 are seamlessly electrically connected with each other. Together they form an integral conductive mesh that fully and seamlessly encloses the electronic components 10 and the secure volume 14 and provide an integral detection shield around the electronic components 10 and the secure volume 14.

In addition, the method may comprise the 3-dimensional printing of connection lines between the first set of embedded detection lines 30 and the sensing circuitry 50 and/or between the second set of embedded detection lines 31 and the sensing circuitry 50 which is not explicitly shown in the above figures.

Figure 6:
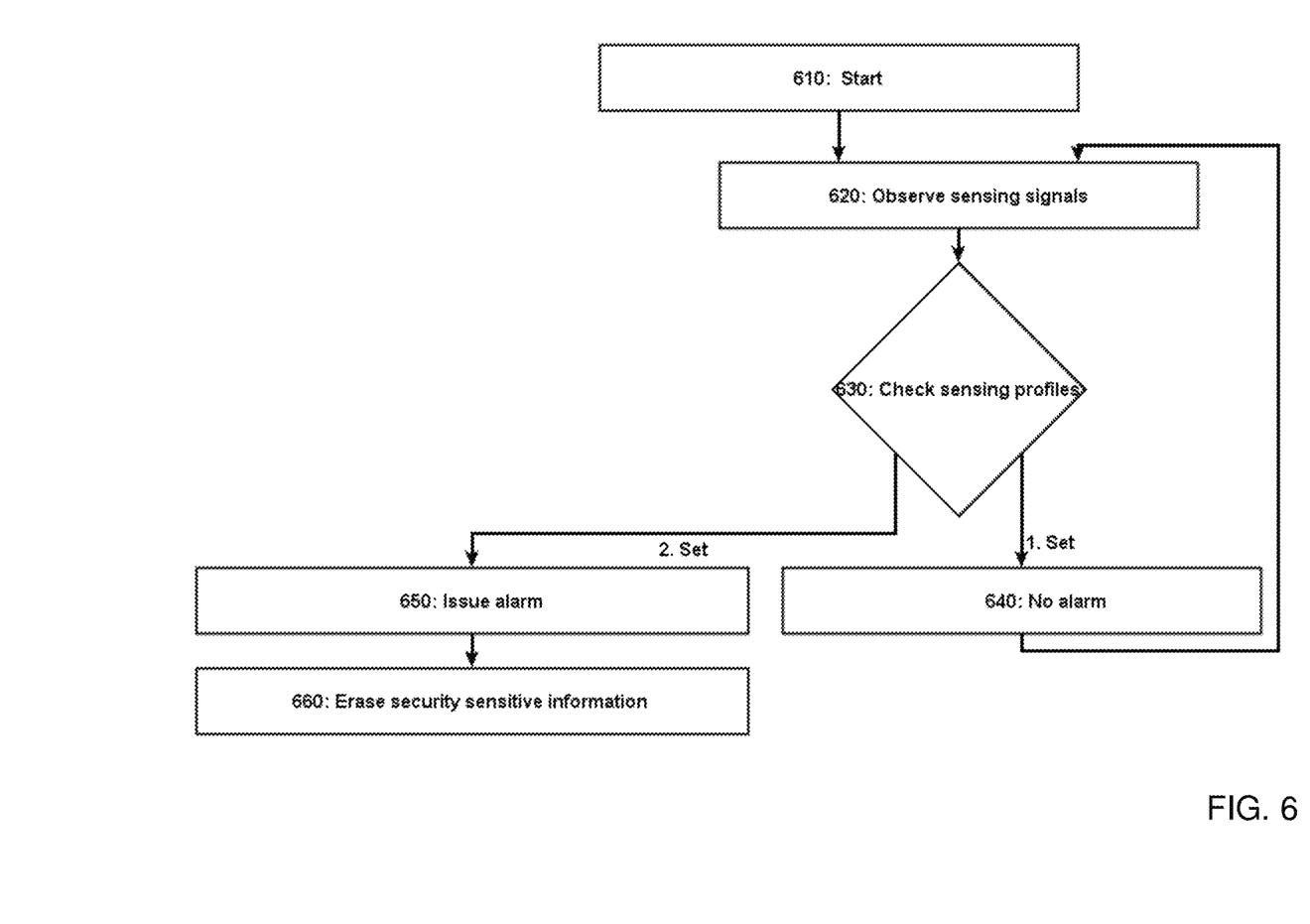
FIG. 6 illustrates steps of a method for observing sensing signals of sensing circuitry of a security system according to an embodiment of the invention.

FIG. 6 illustrates steps of a method for observing sensing signals of sensing circuitry of a security system according to an embodiment of the invention. The method may be performed e.g. by a computer program product running on one or more of the electronic components, e.g. the electronic components 10 of FIG. 1, 2 or 4. The computer program product may be stored e.g. in the memory 410 of the electronic component 10.

At a step 610, the method is started.

At a step 620, the sensing circuitry starts to observe the sensing signals of the integral mesh 33.

At a step 630, the sensing circuitry checks and compares sensing profiles of the sensing signals with predefined sensing profiles.

If the detected sensing profile corresponds to a first set of sensing profiles associated to non-tampering events, the sensing circuitry refrains from issuing an alarm signal at a step 640 and continues to observe the sensing signals.

If the detected sensing profile corresponds to a second set of sensing profiles associated to tampering events, the sensing circuitry provides/issues at a step 650 an alarm signal.

Then the electronic component 10 initiates at a step 660 an action to obstruct analysis of the security-sensitive information, e.g. by erasing the security sensitive information.

Figures 7A, 7B, 7C:
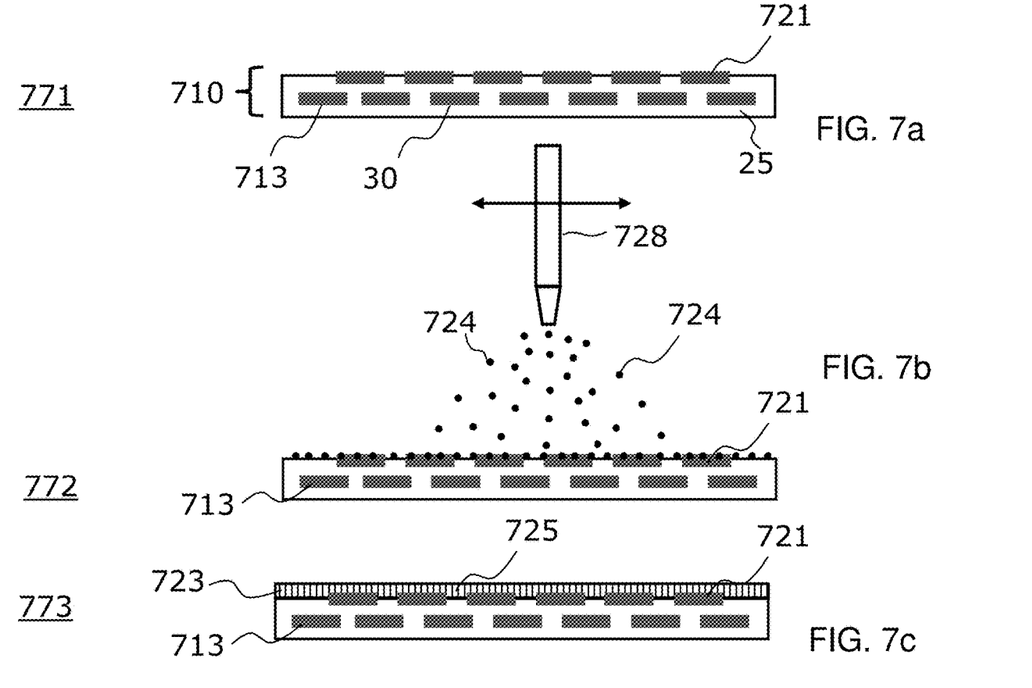
FIGS. 7a, 7b, 7c, 7d and 7e illustrate in a schematic and simplified way method steps of a method for integrating a piezoelectric sensor device into an enclosure according to an embodiment of the invention.

FIGS. 7a, 7b, 7c, 7d and 7e illustrate in a schematic and simplified way method steps of a method for fabricating a tamper respondent assembly according to another embodiment of the invention. The method illustrated in FIGS. 7a to 7e may be combined or integrated with the methods steps as described above. In particular, the method illustrated in FIGS. 7a to 7e may be used to integrate a piezoelectric sensor in the printed circuit board 21 and/or the cover part 22 of the enclosure 20 in an advantageous way. Such an integration comprises steps as follows:

At a step 771, a base structure 710 is provided. The base structure 710 comprises a first conductive layer 721 and a third conductive layer 713. The base structure 710 may be fabricated e.g. as part of the fabrication of the printed circuit board. The base structure 710 may comprise an electrically insulating material as base material 25, in particular a polymer, in particular a composite material such as fiber-reinforced plastic (FRP) as used for printing of the printed circuit board.

The first conductive layer 721 and the third conductive layer 713 may be in particular embodied as conductive meshes. Each of the conductive meshes comprises an electrically conductive material, in particular a metal such as copper. The third conductive layer 713 may establish according to embodiments a part of the first set of embedded detection lines 30 and is hence also denoted with reference numeral 30.

The base structure 710 may be in particular formed by a 3-dimensional printing process. Accordingly, the 3-dimensional printing process starts by printing several layers of the insulating base material 25. Then it continues by printing the third conductive layer 713 or according to another notation a part of the embedded detection lines 30. Then it continues by printing again layers of the insulating base material 25 and on top of it by printing the first conductive layer 721.

At steps 772 and 773, a piezoelectric layer 723 is deposited on the first conductive layer 721.

The depositing of the piezoelectric layer 723 comprises as step 772 a spraying of a plurality of nanoparticles 724 onto the base structure 710. As a result, the plurality of nanoparticles 724 assemble on the surface of the base structure 710, in particular on the first conductive layer 721. The nanoparticles 724 may be in particular ZnO-nanoparticles. The nanoparticles 724 may be in particular solubilized in a solvent such as water, or Ethanol, or butyl acetate.

Hence, according to embodiments the step 772 may comprise spraying a solution comprising the nanoparticles 724 and a solvent, e.g. by means of a spray gun 728.

The depositing of the piezoelectric layer 723 comprises as step 773 a growing of a plurality of nanorods 725 from the plurality of nanoparticles 724 on the base structure 710. As a result, the piezoelectric layer 723 comprises a plurality of nanorods 725. The plurality of nanorods 725 may be grown in particular by a chemical growth process. The chemical growth process may be in particular a low temperature growth process performed at a temperature below 150° C. In embodiments of the invention, the nanorods 725 have an aspect ratio between about 2 and about 50.

According to embodiments of the invention, the chemical growth process performed at step 773 involves placing the first structure 710 with the nanoparticles 724 in a solution comprising hexamethylenetetramine. The growth process may be performed in particular at a temperature range between 80° C. and 100° C.

At the end of step 773, a complete piezoelectric layer 723 comprising a plurality of nanorods 725 has been grown on the first conductive layer 721.

Figure 7D:
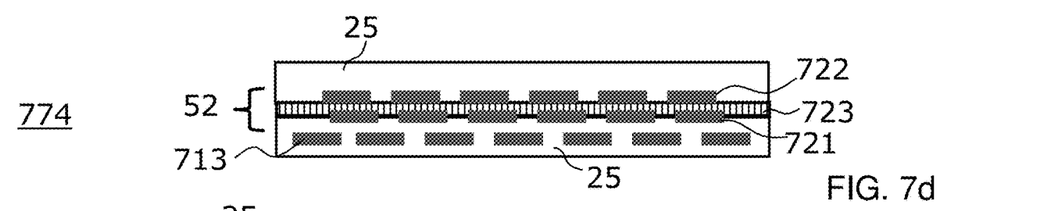

Then at a step 774, a second conductive layer 722 is printed on the piezoelectric layer 123 by a 3D-printing process. Next, several layers of the insulating base material 25 are deposited by 3-dimensional printing on the second conductive layer 122.

The first conductive layer 721, the second conductive layer 722 and the piezoelectric layer 723 establish a piezoelectric sensor 52, which may also be denoted as piezoelectric sensor device 52. More particularly, the first conductive layer 721 and the second conductive layer 722 may serve as electrodes of the piezoelectric sensor device and the piezoelectric layer 723 as the sensing element that provides an electrical voltage between the first conductive layer 721 and the second conductive layer 722 upon deformation of the piezoelectric layer 723.

The second conductive layer 722 may also be embodied as conductive mesh and may comprise an electrically conductive material, in particular a metal such as copper.

In further steps the printing of the printed circuit board may be completed in similar manner as illustrated e.g. with reference to FIG. 5c.

Figure 7E:
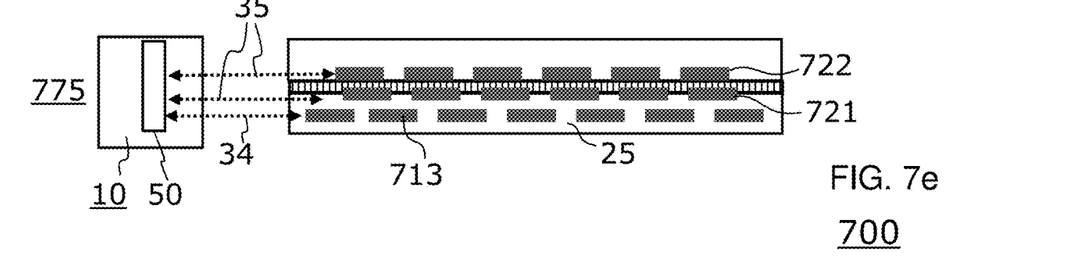

This may involve printing connection lines 34 between the third conductive layer 713 (corresponding to the first set of embedded detection lines 30) and the sensing circuitry 50 of the electronic component(s) 10. In addition, the printing of the first set of embedded detection lines 30 may be continued. Furthermore, connection lines 35 between the sensor device 52 and the sensing circuitry 50 may be printed to observe sensing signals of the piezoelectric layer 723, more particularly a voltage between the first conductive layer 721 and the second conductive layer 722. These connections are schematically illustrated in FIG. 7e.

The method as described above may be used as an alternative approach to the assembling of prefabricated sensor devices 51 as illustrated e.g. in FIG. 5b. The method may be used for integrating piezoelectric sensor devices into the printed circuit board 21 as well as into the cover part 22 of the enclosure 20.

The terms "about," "substantially," "approximately," "slightly less than," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product. The computer program product may include a computer readable storage medium (or media) having computer readable program instructions thereon for causing a processor/processing unit, e.g. the processing unit 420 of the electronic component 10 of FIG. 4, to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to fabricate a tamper respondent assembly, the tamper respondent assembly comprising an electronic component and an enclosure fully enclosing the electronic component, the method comprising
    printing, by a 3-dimensional printer, a printed circuit board, the printed circuit board forming a bottom part of the enclosure and comprising:
        a first set of embedded detection lines for detecting tampering events; and
        signal lines for transferring signals between the electronic component and an external device;
    assembling the electronic component on the printed circuit board;
    printing, by the 3-dimensional printer, a cover part of the enclosure on the printed circuit board, the cover part of the enclosure comprising a second set of embedded detection lines; and
    providing sensing circuitry for sensing the conductance of the first set of embedded detection lines and the second set of embedded detection lines to detect tampering events.

2. A method according to claim 1, wherein the first set of embedded detection lines and the second set of embedded detection lines are electrically connected to each other.

3. A method according to claim 1, wherein the first set of embedded detection lines and the second set of embedded detection lines are formed as integral conductive mesh, the integral conductive mesh fully and seamlessly enclosing the electronic component.

4. A method according to claim 1 further comprising embedding one or more sensor devices into the enclosure.

5. A method according to claim 4, wherein embedding the one or more sensor devices into the enclosure comprises:
    interrupting the printing of the printed circuit board;
    assembling one or more sensor devices into the printed circuit board; and
    continuing the printing of the printed circuit board.

6. A method according to claim 4, wherein embedding the one or more sensor devices into the enclosure comprises:
    interrupting the printing of the cover part of the enclosure;
    assembling one or more sensor devices into the cover part of the enclosure; and
    continuing the printing of the cover part of the enclosure.

7. A method according to claim 4, wherein the one or more sensor devices include a piezo sensor.

8. A method according to claim 4, wherein the one or more sensor devices include an optical sensor.

9. A method according to claim 4, wherein the one or more sensor devices include a proximity sensor.

10. A method according to claim 1, wherein assembling the electronic component on the printed circuit board comprises attaching the electronic component to the printed circuit board by a soldering technique.

11. A method according to claim 1 further comprising:
    integrating a piezoelectric sensor in the enclosure, the integrating comprising:
        providing a base structure comprising a first conductive layer;
        depositing a piezoelectric layer on the first conductive layer, the piezoelectric layer comprising a plurality of nanorods;
        covering the piezoelectric layer with a second conductive layer; and providing sensing circuitry for observing sensing signals of the piezoelectric layer.

12. A method according to claim 11, the depositing of the piezoelectric layer comprising:
spraying a plurality of nanoparticles onto the first structure; and
growing the plurality of nanorods on the first structure.

13. A method according to claim 11, wherein growing the plurality of nanorods comprises a chemical growth process.

14. A method according to claim 13, wherein the chemical growth process is a low temperature growth process performed at a temperature below about 150° C.

15. A method according to claim 13, wherein the chemical growth process involves placing the first structure with the nanoparticles in a solution comprising hexamethylenetetramine.

16. A method according to claim 11, wherein the nanoparticles are selected from a group consisting of zinc oxide, lead zirconate titanate, and barium titanate.

17. A tamper respondent assembly comprising:
a 3-dimensionally printed circuit board;
an electronic component to be protected and assembled on the 3-dimensionally printed circuit board;
an enclosure fully enclosing the electronic component; and
sensing circuitry;
wherein the printed circuit board forms a bottom part of the enclosure and comprises:
a first set of embedded detection lines; and
signal lines for transferring signals between the electronic component and an external device;
wherein a 3-dimensionally printed cover part of the enclosure is arranged on the printed circuit board and comprises a second set of embedded detection lines; and
wherein the sensing circuitry is configured to sense the conductance of the first set and the second set of embedded detection lines to detect tampering events.

18. A tamper respondent assembly according to claim 17, wherein the first set of embedded detection lines and the second set of embedded detection lines are electrically connected to each other.

19. A tamper respondent assembly according to claim 17, wherein the first set of embedded detection lines and the second set of embedded detection lines are formed as integral conductive mesh, the integral conductive mesh fully and seamlessly enclosing the electronic component.

20. A tamper respondent assembly according to claim 17, wherein the sensing circuitry is configured with a plurality of sensing profiles, the plurality of sensing profiles comprising a first set of sensing profiles associated to non-tampering events and a second set of sensing profiles associated to tampering events.

21. A tamper respondent assembly according to claim 17 further comprising one or more sensor devices embedded in the printed circuit board and/or the cover part of the enclosure.

22. A tamper respondent assembly according to claim 21, wherein the one or more sensor devices are selected from a group consisting of a piezoresistive sensor, an optical sensor, a proximity sensor and a hall sensor.

23. A tamper respondent assembly according to claim 17 further comprising:
a piezoelectric sensor integrated in the enclosure, wherein the piezoelectric sensor comprises:
a base structure comprising a first conductive layer;
a second conductive layer;
a piezoelectric layer arranged between the first conductive layer and the second conductive layer, the piezoelectric layer comprising a plurality of nanorods; and
sensing circuitry configured to observe sensing signals of the integrated piezoelectric sensor.

24. A security system for protecting security-sensitive information, the security system comprising:
a 3-dimensionally printed circuit board;
an electronic component configured to store and/or process security sensitive information and assembled on the 3-dimensionally printed circuit board;
an enclosure fully enclosing the electronic component; and
sensing circuitry;
wherein the printed circuit board forms a bottom part of the enclosure and comprises:
a first set of embedded detection lines; and
signal lines for transferring signals between the electronic component and an external device;
a 3-dimensionally printed cover part of the enclosure is arranged on the printed circuit board and comprises a second set of embedded detection lines;
the sensing circuitry is configured to:
sense the conductance of the first set and the second set of embedded detection lines to detect tampering events; and
provide an alarm signal to the electronic component upon detection of predefined sensing profiles;
the electronic component is configured to initiate an action to obstruct analysis of the security-sensitive information upon receipt of the alarm signal.

25. A computer program product for observing sensing signals of sensing circuitry of a security system for protecting security-sensitive information, the security system comprising:
a 3-dimensionally printed circuit board;
an electronic component configured to store and/or process security sensitive information and assembled on the 3-dimensionally printed circuit board;
an enclosure fully enclosing the electronic component; and
sensing circuitry;
wherein:
the printed circuit board forms a bottom part of the enclosure and comprises:
a first set of embedded detection lines; and
signal lines for transferring signals between the electronic component and an external device; and
a 3-dimensionally printed cover part of the enclosure is arranged on the printed circuit board and comprises a second set of embedded detection lines; and
the computer program product comprises a computer readable storage medium having program instructions embodied therewith, the program instructions executable by the security system to cause the security system to perform a method comprising:
observing sensing signals of the first set and the second set of embedded detection lines;
providing an alarm signal upon detection of predefined sensing profiles; and
initiating an action to obstruct analysis of the security-sensitive information upon receipt of the alarm signal.

* * * * *